United States Patent
Kadam et al.

(10) Patent No.: US 10,047,573 B2
(45) Date of Patent: Aug. 14, 2018

(54) IN-LINE TORTIONAL VIBRATION MITIGATION MECHANISM FOR OIL WELL DRILLING ASSEMBLY

(71) Applicant: HALLIBURTON ENERGY SERVICES, INC., Houston, TX (US)

(72) Inventors: Ratish Suhas Kadam, Pune (IN); Bhargav Gajji, Pune (IN); Ankit Purohit, Pune (IN); Rahul Ramchandra Gaikwad, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 70 days.

(21) Appl. No.: 15/039,381

(22) PCT Filed: Dec. 23, 2013

(86) PCT No.: PCT/US2013/077534
§ 371 (c)(1),
(2) Date: May 25, 2016

(87) PCT Pub. No.: WO2015/099666
PCT Pub. Date: Jul. 2, 2015

(65) Prior Publication Data
US 2017/0030149 A1 Feb. 2, 2017

(51) Int. Cl.
*E21B 17/07* (2006.01)
*E21B 3/00* (2006.01)
(Continued)

(52) U.S. Cl.
CPC .............. *E21B 17/076* (2013.01); *E21B 3/00* (2013.01); *E21B 4/003* (2013.01); *F16D 3/12* (2013.01); *F16D 3/80* (2013.01); *F16D 41/18* (2013.01)

(58) Field of Classification Search
CPC . E21B 17/076; E21B 3/00; E21B 3/12; E21B 3/80; E21B 4/003; F16D 3/80; F16D 3/12; F16D 41/18
See application file for complete search history.

(56) References Cited

U.S. PATENT DOCUMENTS

| | | | |
|---|---|---|---|
| 4,162,619 A | 7/1979 | Nixon, Jr. | |
| 4,232,751 A * | 11/1980 | Trzeciak | E21B 4/02 166/237 |

(Continued)

FOREIGN PATENT DOCUMENTS

| | | |
|---|---|---|
| CN | 102788104 A | 11/2012 |
| CN | 103069159 A | 4/2013 |

(Continued)

OTHER PUBLICATIONS

Extended European Search Report for EP 13900158.0, 7 pages, dated Jun. 22, 2017.
(Continued)

*Primary Examiner* — Giovanna C. Wright
*Assistant Examiner* — Yanick A Akaragwe (57) ABSTRACT

An assembly for inclusion between a drill bit and a drill string, the assembly having an overrunning clutch mechanism that disengages the drill bit from the drill string during the "slip" portion of a stick-slip cycle to allow the drill bit to freely rotate faster than the drill string. The assembly further includes a rotational vibration dampener operatively connected between the overrunning clutch and the drill bit. The vibration dampener may include a fluid chamber with viscous fluid or restrictions to fluid flow to effect dampening. During normal operation, the one-way overrunning clutch remains engaged to transfer torque between the drill string and bit, while the torsional damper is in its maximum displaced position to transfer the load. During slip, the drill bit is disengaged until its speed is lower than the drill string
(Continued)

speed. Torsional vibration dampener dampens sudden impulse force of the overrunning clutch re-engaging.

20 Claims, 8 Drawing Sheets

(51) Int. Cl.
*F16D 3/12* (2006.01)
*F16D 3/80* (2006.01)
*F16D 41/18* (2006.01)
*E21B 4/00* (2006.01)

(56) References Cited

U.S. PATENT DOCUMENTS

| | | | |
|---|---|---|---|
| 4,427,079 | A | 1/1984 | Walter |
| 5,156,223 | A | 10/1992 | Hipp |
| 5,305,837 | A | 4/1994 | Johns et al. |
| 6,332,841 | B1 | 12/2001 | Secord |
| 6,536,520 | B1 | 3/2003 | Snider et al. |
| 6,637,567 | B2 | 10/2003 | Doornbos |
| 6,808,455 | B1 | 10/2004 | Solorenko et al. |
| 7,036,612 | B1 | 5/2006 | Raymond et al. |
| 7,219,752 | B2 | 5/2007 | Wassell et al. |
| 7,748,474 | B2 | 7/2010 | Watkins et al. |
| 7,984,771 | B2 | 7/2011 | Pabon et al. |
| 7,997,357 | B2 | 8/2011 | Wassell et al. |
| 8,240,401 | B2 | 8/2012 | Wassell et al. |
| 2002/0108831 | A1 | 8/2002 | Pawley |
| 2004/0238219 | A1 | 12/2004 | Nichols et al. |
| 2005/0194183 | A1 | 9/2005 | Gleitman et al. |
| 2005/0274548 | A1* | 12/2005 | Albert ............ E21B 3/025 175/61 |
| 2011/0120772 | A1 | 5/2011 | McLoughlin et al. |
| 2011/0198126 | A1 | 8/2011 | Swietlik et al. |
| 2011/0214963 | A1 | 9/2011 | Beylotte et al. |
| 2011/0308784 | A1 | 12/2011 | Ollerenshaw et al. |
| 2012/0228028 | A1 | 9/2012 | Turner et al. |

FOREIGN PATENT DOCUMENTS

| | | |
|---|---|---|
| RU | 2005137150 A | 5/2006 |
| WO | WO 2004/109052 A2 | 12/2004 |
| WO | WO 2012/069858 A2 | 5/2012 |
| WO | WO-2013011293 A2 | 1/2013 |

OTHER PUBLICATIONS

Russian Office Action for RU 2016118532, dated Apr. 26, 2017, 10 pages with translation.
International Search Report and Written Opinion, dated May 6, 2014, 10 pages, United States Patent and Trademark Office.
The State Intellectual Property Office of the People's Republic of China, Notice on the Office Action, Oct. 20, 2017, 7 pages, China.
The State Intellectual Property Office of the People's Republic of China, Notice on the Office Action, English Translation, Oct. 20, 2017, 9 pages, China.

* cited by examiner

IN-LINE TORTIONAL VIBRATION MITIGATION MECHANISM FOR OIL WELL DRILLING ASSEMBLY

CROSS-REFERENCE TO RELATED APPLICATIONS

This application is a U.S. national stage patent application of International Patent Application No. PCT/US2013/077534, filed on Dec. 23, 2013, the benefit of which is claimed and the disclosure of which is incorporated herein by reference in its entirety.

TECHNICAL FIELD

The present disclosure relates generally to oilfield equipment, and in particular to mitigation of torsional vibration in downhole tools.

BACKGROUND

Conventional drill bits include drag-type drill bits with polycrystalline diamond compact (PDC) inserts and cutters, which use a shearing action to break the material of the formation. Such PDC cutters and inserts are suitable for continuous loading, but are subject to failure under vibration, chatter, and impact forces.

Accordingly, torsional vibration is a significant concern when drilling using PDC bits. One prevalent cause of torsional vibration is a phenomenon known as "stick-slip." Stick-Slip occurs when the rate of bit rotation suddenly slows or stops, such as when a hard interface or stringer is encountered by the bit. Although the drill bit momentarily slows or stops rotating, the drill string above continues to rotate, causing the drill string to wind up and torsionally store potential energy. This is the "stick" phase of the stick-slip cycle.

As the drill string winds up, drill string torque increases and drill string length decreases. At some point, either due to the increased drill string torque or decreased drill string length causing the bit to take a lesser bite of the formation, the formation shears and the bit rotates again. Due to the high energy stored in the drill string, the drill bit breaks free violently and over speeds as the drill string unwinds. This is the "slip" phase of the stick-slip cycle.

Stick-slip causes chatter, repeated impacts of the PDC cutters against the rock face, and drill string oscillation. Stick-slip is typically addressed by either increasing the bit speed or reducing the weight on bit. It is desirable, however, to provide a tool that mitigates torsional vibration without the need to increase the bit speed or reduce the weight on bit.

BRIEF DESCRIPTION OF THE DRAWINGS

Embodiments are described in detail hereinafter with reference to the accompanying figures, in which.

DETAILED DESCRIPTION

The foregoing disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures. For example, if the apparatus in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Figure 1:
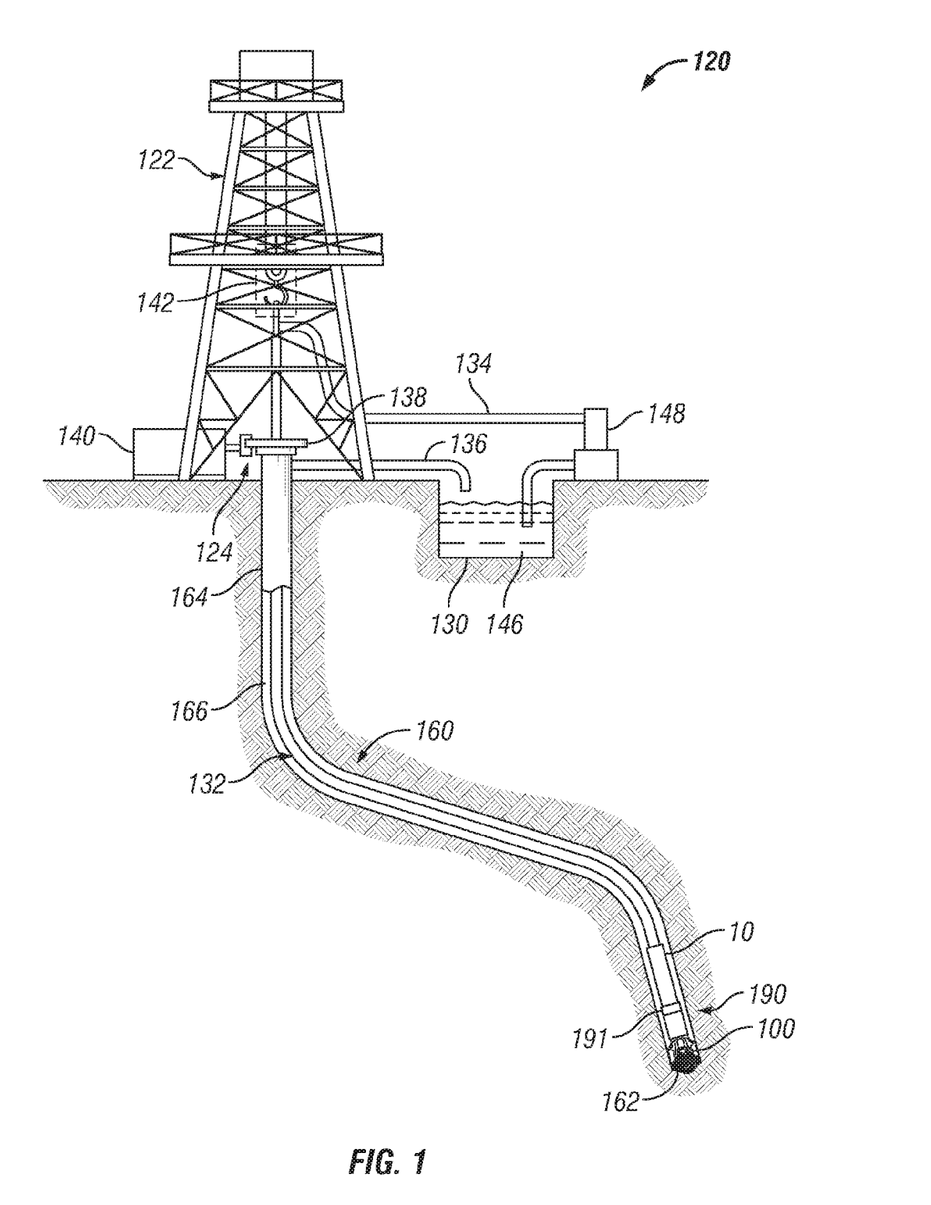
FIG. 1 is a block-level schematic diagram of a drilling system according to an embodiment, showing a drill string and an inline torsional vibration mitigation system such as that of FIG. 2 for drilling a bore in the earth.

FIG. 1 illustrates a drilling system 120 including an inline torsional vibration mitigation system 10 according to a preferred embodiment. Drilling system 120 may include land drilling rig 122. However, teachings of the present disclosure may be satisfactorily used in association with offshore platforms, semi-submersible, drill ships and any other drilling system satisfactory for forming a wellbore extending through one or more downhole formations.

Drilling rig 122 and may be located proximate well head 124. Drilling rig 122 also includes rotary table 138, rotary drive motor 140 and other equipment associated with rotation of drill string 132 within wellbore 160. Annulus 166 may be formed between the exterior of drill string 132 and the inside diameter of wellbore 160.

For some applications drilling rig 122 may also include top drive motor or top drive unit 142. Blow out preventers (not expressly shown) and other equipment associated with drilling a wellbore may also be provided at well head 124. One or more pumps 148 may be used to pump drilling fluid 146 from fluid reservoir or pit 130 to one end of drill string 132 extending from well head 124. Conduit 134 may be used to supply drilling mud from pump 148 to the one end of drilling string 132 extending from well head 124. Conduit 136 may be used to return drilling fluid, formation cuttings and/or downhole debris from the bottom or end 162 of wellbore 160 to fluid reservoir or pit 130. Various types of pipes, tube and/or conduits may be used to form conduits 134 and 136.

Drill string 132 may extend from well head 124 and may be coupled with a supply of drilling fluid such as pit or reservoir 130. The opposite end of drill string 132 may include bottom hole assembly 190 and rotary drill bit 100 disposed adjacent to end 162 of wellbore 160. Rotary drill bit 100 may include one or more fluid flow passageways with respective nozzles disposed therein. Various types of drilling fluids 146 may be pumped from reservoir 130 through pump 148 and conduit 134 to the end of drill string 132 extending from well head 124. The drilling fluid 146 may flow through a longitudinal bore (not expressly shown) of drill string 132 and exit from nozzles formed in rotary drill bit 100.

At end 162 of wellbore 160, drilling fluid 146 may mix with formation cuttings and other downhole debris proximate drill bit 100. The drilling fluid will then flow upwardly through annulus 166 to return formation cuttings and other downhole debris to well head 124. Conduit 136 may return the drilling fluid to reservoir 130. Various types of screens, filters and/or centrifuges (not shown) may be provided to remove formation cuttings and other downhole debris prior to returning drilling fluid to pit 130.

Bottom hole assembly 190 includes an inline torsional vibration mitigation system 10 according to a preferred embodiment. Bottom hole assembly 190 may also include various other tools 191, such as those that provide logging or measurement data and other information from the bottom of wellbore 160. Measurement data and other information may be communicated from end 162 of wellbore 160 through drill string 132 using known measurement while drilling techniques and converted to electrical signals at well surface 124, to, among other things, monitor the performance of drilling string 132, bottom hole assembly 190 and associated rotary drill bit 100.

Figure 2:
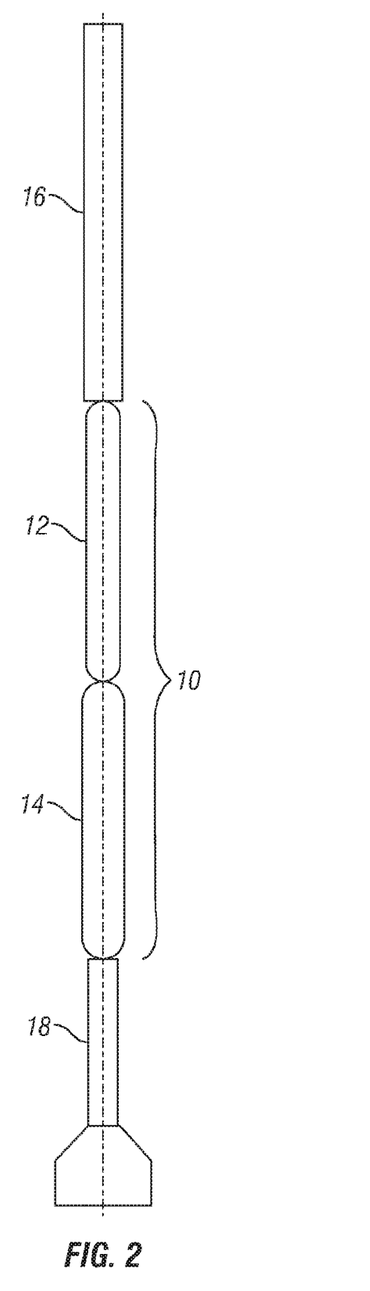
FIG. 2 is a block diagram of an inline torsional vibration mitigation system according to a preferred embodiment, showing a drill collar, an overrunning clutch assembly, a torsional dampener, and a bottom hole assembly.

FIG. 2 illustrates a block diagram of a rotational vibration mitigation tool 10 according to a preferred embodiment. Tool 10 is primarily a mechanical tool that does not require any electronics and controls. Tool 10 ideally includes an overrunning clutch assembly 12 and a torsional dampener assembly 14, and it may be connected between a drill string or drill collar 16 and a bottom hole assembly 18.

Overrunning clutch assembly 12 allows torque transfer from the drill string or drill collar 16 to bottom hole assembly 18 in one direction only. During the "slip" portion of a stick-slip cycle, when the bit has a tendency to over speed, overrunning clutch assembly 12 decouples the bottom hole assembly 18 from the end of the drill string or drill collar 16 to which the overrunning clutch assembly 12 is connected.

Torsional dampener assembly 14 dampens the rotational impact loads coming from sudden engagement during operation of overrunning clutch assembly 12. Additionally, torsional dampener assembly 14 dampens rotational vibration originating from other sources or mechanisms as well, including vibration transferred by the drill string.

Figure 3:
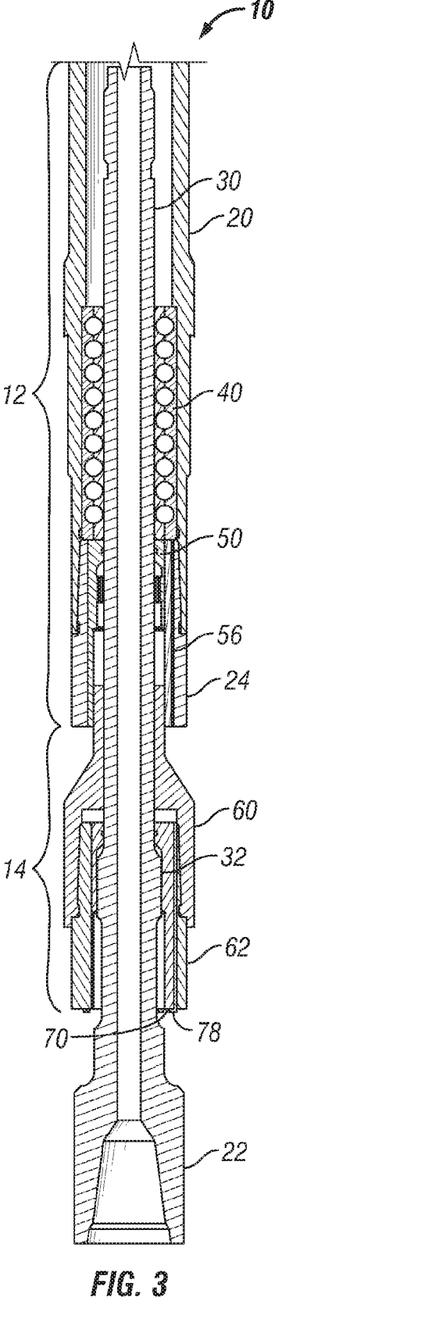
FIG. 3 is an axial cross section of the overrunning clutch assembly and torsional dampener of FIG. 2.
Figure 4:
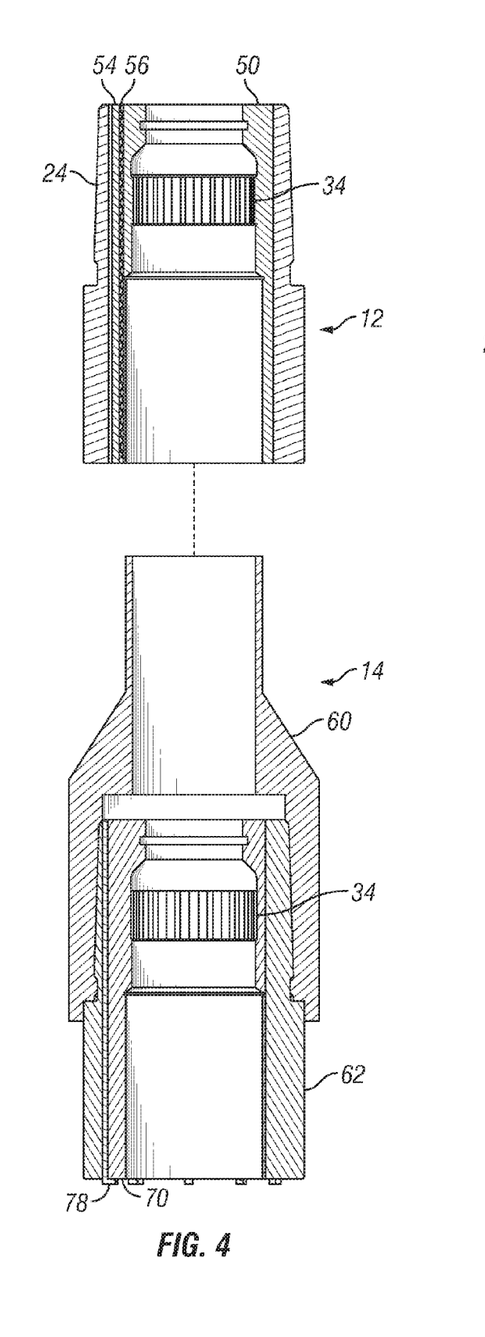
FIG. 4 is an enlarged exploded diagram in axial cross section of a portion of the overrunning clutch assembly of FIG. 3, less its thrust bearing, and a portion of the torsional dampener of FIG. 3, both shown with the output shaft removed for clarity.
Figure 5:
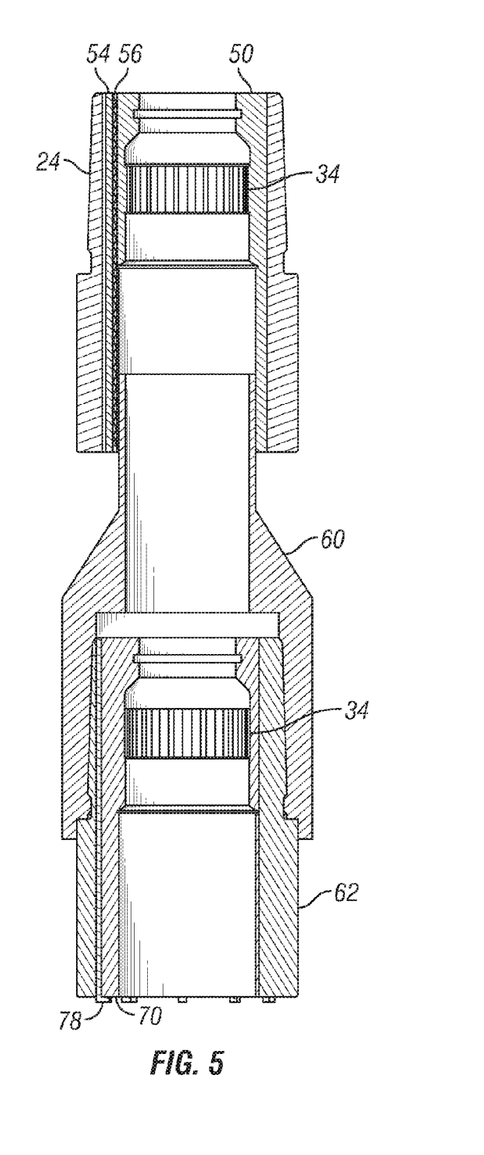
FIG. 5 is an elevation in axial cross section of the assembly of FIG. 4 illustrating the connection between the overrunning clutch assembly and the torsional dampener, showing an outer clutch housing and inner clutch mandrel of the overrunning clutch assembly and an outer dampener housing and inner dampener mandrel of the torsional dampener.

FIG. 3 is an axial cross section of tool 10 according to a preferred embodiment. The upper end of tool 10 includes an upper clutch housing 20, which connects to drill string or drill collar 16 (FIG. 2) in a conventional manner known to routineers in the art, such as by threading. For example, a pin end (not illustrated) may be provided. The lower end of tool 10 may include a box connector 22, for example, for connection to the bottom hole assembly 18 (FIG. 2).

Box connector 22 is formed at the lower end of an output shaft 30, which is in turn rotatively carried by upper clutch housing 20 by a thrust bearing assembly 40 located within overrunning clutch assembly 12. The axial weight on bit is transferred from drill string or drill collar 16 to bottom hole assembly 18 (FIG. 2) via upper clutch housing 20, thrust bearing assembly 40, and output shaft 30.

Figure 6:
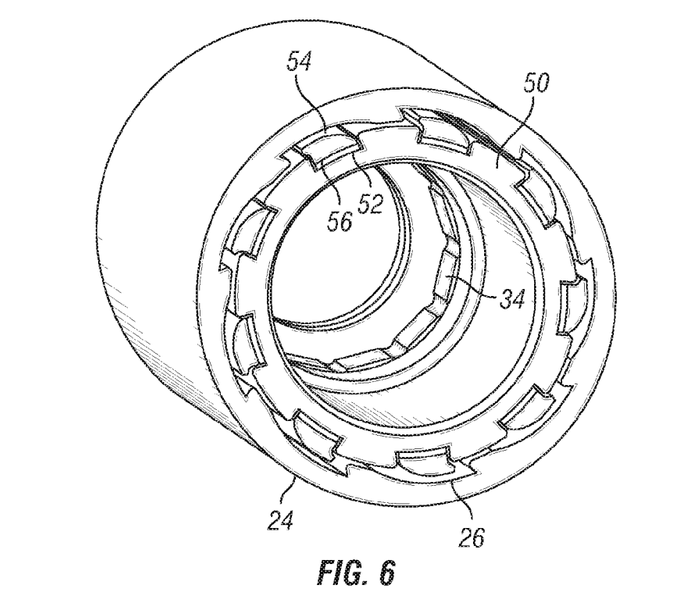
FIG. 6 is a perspective view of the bottom end of the overrunning clutch assembly of FIG. 4, showing an outer clutch housing having interior asymmetrical serrations, an inner clutch mandrel having outer longitudinal grooves, and wedges positioned therebetween for creating a freewheel effect.
Figure 7A:
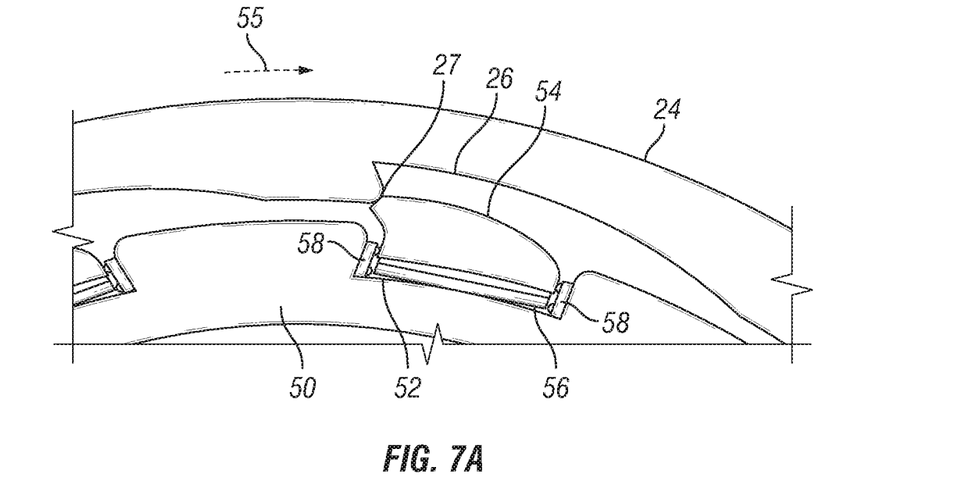
FIG. 7A is a detailed view of a portion of the overrunning clutch assembly of FIG. 6, showing the wedge in an radially outward position engaging the outer clutch housing.
Figure 7B:
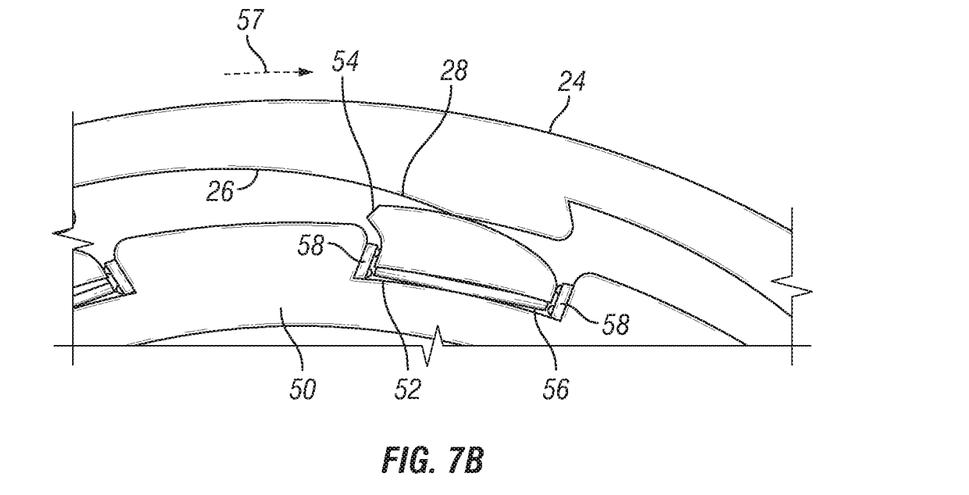
FIG. 7B is a detailed view of a portion of the overrunning clutch assembly of FIG. 6, showing the wedge in an radially inward position disengaged from the outer clutch housing.

Referring to FIGS. 3-7B, overrunning clutch 12 includes a lower clutch housing 24 that is threaded or otherwise connected to the bottom of upper clutch housing 20. As best seen in FIGS. 6-7B, the interior surface of lower clutch housing 24 has asymmetrically tapered longitudinally-oriented serrations 26 formed therein.

A generally tubular clutch mandrel 50 is coaxially positioned within lower clutch housing 24. Clutch mandrel 50 is characterized by longitudinal grooves 52 being formed in its outer circumferential surface. Although not necessary, the number of grooves 52 in clutch mandrel 50 preferably corresponds to the number of serrations 26 in lower clutch housing 24.

Figure 8:
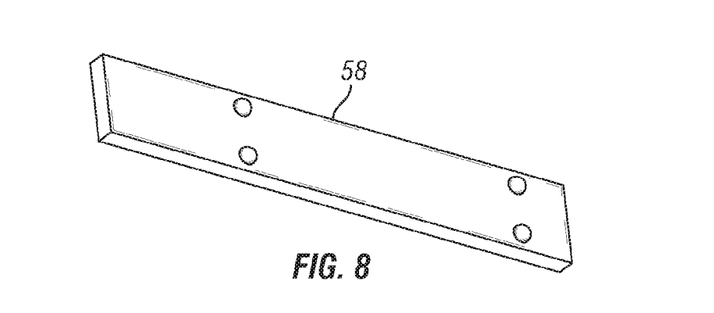
FIG. 8 is a detailed perspective view of a centering guide member of the overrunning clutch assembly of FIG. 6.
Figure 9:
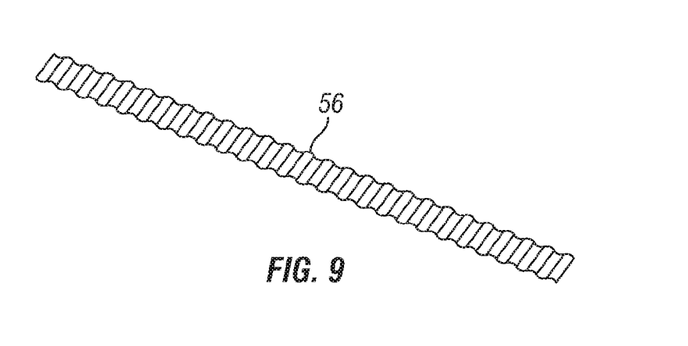
FIG. 9 is a detailed perspective view of a wave-shaped spring of the overrunning clutch assembly of FIG. 6.

Referring to FIGS. 7-9, in each groove 52, an elongate wedge 54, a spring 56, and two centering guide members 58 are positioned. Spring 56 urges wedge 54 radially outward from clutch mandrel 50. Centering guide members 58 angularly center spring 46 and wedge 54 within groove 52. In a preferred embodiment, spring 56 is a linear wave spring that is compressed easily by wedge 54 so as to minimize wear and tear.

As illustrated in FIG. 7A, during normal drilling operation, lower clutch housing 24 rotates in the direction shown by arrow 55. Wedge 54 of overrunning clutch assembly 12, urged radially outward by spring 56, will always be in contact with the sharply angled portion 27 of serration 26 of lower clutch housing 24 so that the entire drilling torque gets transferred from lower clutch housing 24 to clutch mandrel 50 in the same manner as an ordinary spline drive.

In a stick-slip condition, torque is transferred in stick phase as drill string 16 (FIG. 2) continues to rotate. When the drill bit finally breaks free and drill string unwinding begins, the bottom hole assembly 18 will tend to over-speed due to the stored torsional potential energy in the drill string. If mandrel 50 rotates faster than lower clutch housing 24, as shown by the relative speed vector 57 in FIG. 7B, wedge 54 contacts and is forced radially inward by the gentle tapered slope surface 28 of serration 26, compressing spring 56 and thereby allowing serration 26 to slip past wedge 54. In this manner, lower clutch housing 24 is torsionally decoupled from mandrel 50 when mandrel 50 rotates faster than lower clutch housing 24.

Because of overrunning clutch assembly 12, the bottom hole assembly 18 remains decoupled from surface torque until its speed is reduced by friction, at the bit and stabilizers for example. When the bottom hole assembly speed becomes equal to the speed of the drill string where it connects to the overrunning clutch assembly 12, wedge 54 again engages portion 27 of serration 26, and torque transfer begins again. Persons of ordinary skill in the art will appreciate that the engagement surfaces of the corresponding components may be formed of materials with specific frictional properties to achieve a desired threshold before slip occurs. For example, wedge 54 may be formed of a material with a friction coefficient selected to slip relative to slope 28 upon a particular force or rotational speed. Likewise, springs 56 may be adjusted to achieve the desired frictional engagement between wedge 54 and slope 28.

In order to minimize impact loading during re-engagement of overrunning clutch 12, torsional dampener assembly 14 is optionally provided. Referring to FIGS. 3-5 and 10-12, according to a preferred embodiment, torsional dampener assembly 14 includes a tubular upper dampener housing 60 and a tubular lower dampener housing 62. Lower dampener housing 62 is connected to upper dampener housing 60 via a threaded connection or other suitable means as is known to routineers in the art. Upper dampener housing 60 has an upper end with a reduced diameter that is received within and connected to the lower end of clutch mandrel 50 of overrunning clutch 12, by threads, press-fit, or other suitable means. Accordingly, upper dampener housing 60 and lower dampener housing 62 receive drill string torque during normal drilling but freewheel during over-speed conditions.

Figure 10:
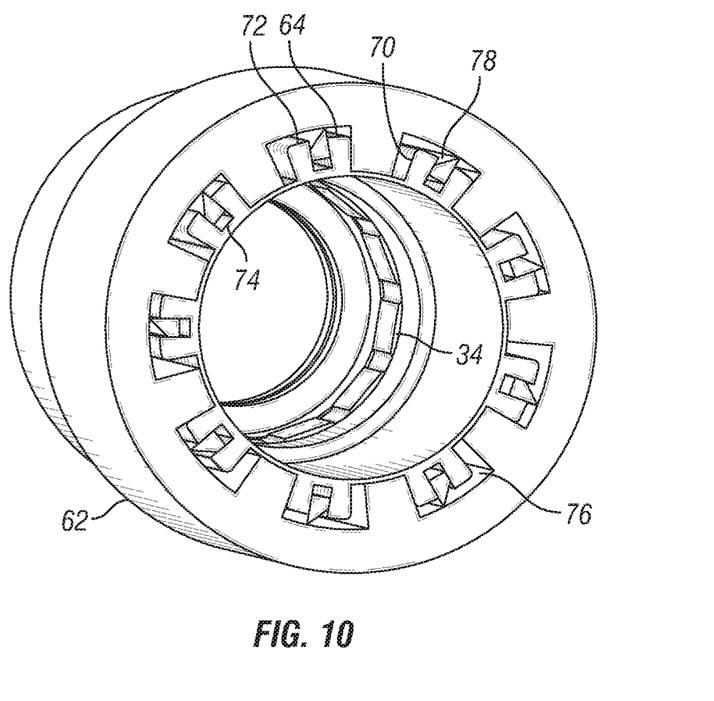
FIG. 10 is a perspective view of the bottom end of the torsional dampener assembly of FIG. 4, showing an outer dampener housing having interior grooves, an inner dampener mandrel having outer longitudinal protrusions, and wiper blades slideably positioned within the protrusions.
Figure 11:
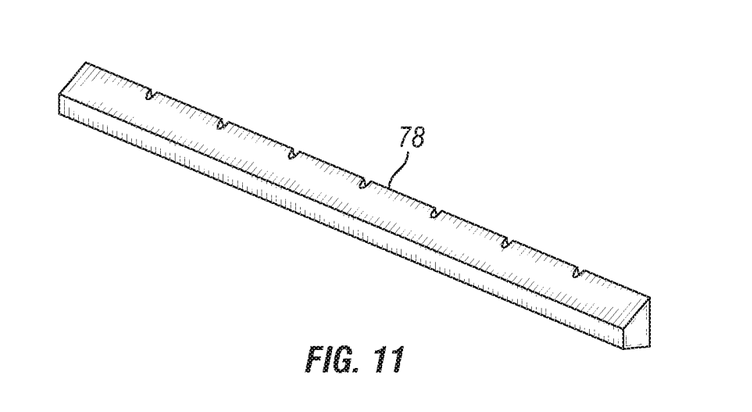
FIG. 11 is a detailed perspective view of the wiper blade of the torsional dampener assembly of FIG. 10.
Figure 12:
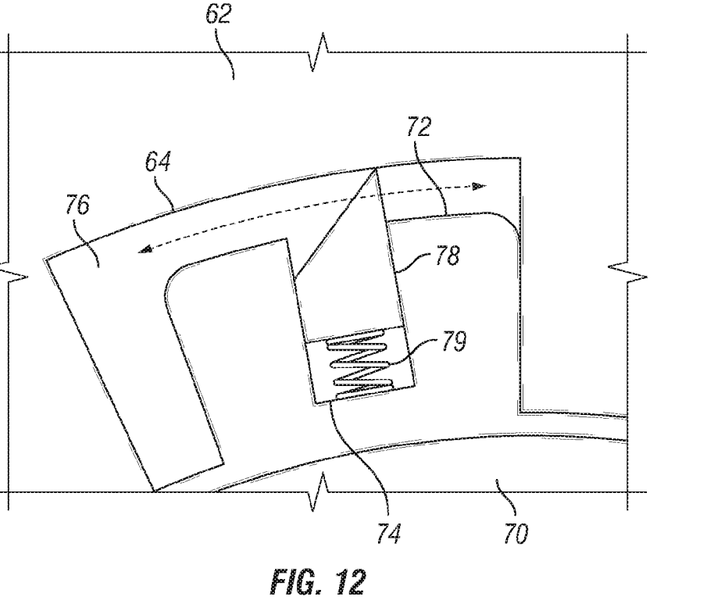
FIG. 12 is a detailed view of a portion of the torsional dampener assembly of FIG. 10, showing the dampener mandrel and housing forming a closed fluid chamber and the wiper blade in an radially outward position engaging the outer circumferential wall of the dampener housing for providing fluidic resistance to relative movement between the dampener mandrel and housing.

Within upper and lower dampener housing 60, 62, torsional dampener assembly 14 includes a coaxially positioned dampener mandrel 70. The inner wall of lower dampener housing 62 has an number of longitudinal grooves 64 formed therein, and the outer circumferential surface of dampener mandrel 70 includes an equal number of longitudinal protrusions 72 formed thereabout. The protrusions 72 fit and are captured within the grooves 64 like a spline fitting, except that the angular dimension of each protrusion 72 is less than the angular dimension of each groove 64 so that there is an amount of rotational play between dampener mandrel 70 and lower dampener housing 62. That is, the lower dampener housing 62 is capable of limited rotational movement with respect to the dampener mandrel 70. The void between dampener mandrel 70 and grooves 64 define a closed fluid chamber 76. Although not illustrated for clarity, one of ordinary skill in the art understands that the upper and lower ends of fluid chamber 76 is sealed by appropriate structure. Fluid chamber 76 contains a viscous fluid damping of the torsional vibrational energy, as described below.

With particular reference to FIG. 12, within each protrusion 72 on dampener mandrel 70, a radially-oriented longitudinal wiper recess 74 is formed. A wiper blade 78 functions as a flow restrictor and is slideably received within each wiper recess 74 and is urged radially outward by a spring 79 so as to make contact with the outer circumferential surface of groove 64 and thereby obstruct or restrict the free flow of the fluid within groove 64. The viscous fluid must overcome the force of spring 79 to force wiper blade 78 inward in order to pass by the blade to allow dampener mandrel 70 to move relative to lower dampener housing 62. In this manner, torsional dampener assembly 14 provides a damping effect during re-engagement of overrunning clutch assembly 12.

Referring to FIGS. 4-6 and 10, the interior circumferential surface of clutch mandrel 50 and dampener mandrel 70 may have an interior profile 34 disposed to engage a complementary raised portion 32 of output shaft 30 (FIG. 3). Interior profile 34 and raised portion 32 preferably include flats or splines for transferring torque. In the embodiment shown, raised portion 32 of output shaft mates only with interior profile 34 of torsional dampener assembly 14. Torque is transferred from the drill string or drill collar 16 to the bottom hole assembly 18 via upper clutch housing 20, lower clutch housing 24, wedges 54, clutch mandrel 50, upper dampener housing 60, lower dampener housing 62, dampener mandrel 70 and output shaft 30.

In an alternative embodiment, torsional dampener assembly 14 is not included. In this case, raised portion 32 of output shaft 30 mates with interior profile 34 of overrunning clutch assembly 12. Torque is transferred from the drill string or drill collar 16 to the bottom hole assembly 18 via upper clutch housing 20, lower clutch housing 24, wedges 54, clutch mandrel 50, and output shaft 30.

Figure 13:
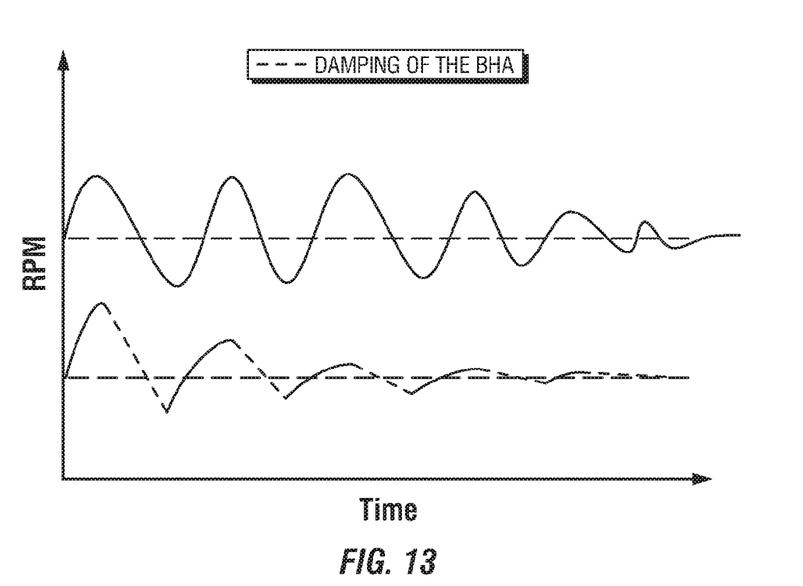
FIG. 13 is a qualitative graph of rotational speed plotted over time, showing rotational speed variations in the bottom hole assembly with and without the tool of FIG. 2 in the event of torsional vibration.

FIG. 13 is a qualitative graph that illustrates the effect of tool 10. Typically, when a drill string is subject to torsional vibration, the entire string is oscillates rotationally due to an excitation force predominately at a single frequency close to the natural frequency of vibration of the system. Such natural unmitigated response is shown in the upper solid line 80 of FIG. 13. With tool 10, the overrunning clutch assembly 12 disengages the bottom hole assembly 18 from the drill string during over-speed conditions. This disengagement results in a sudden change in the system natural frequencies for torsional vibrations and causes a reduction in synchronous excitation due to external forces. Torsional dampener 14 further dampens vibrations. The combined effect of overrunning clutch assembly 12 and torsional dampener 14 upon the natural rotational vibration response 80 is shown by dashed line 82 in FIG. 13. That is, FIG. 13 shows the rotational speed (RPM) variations in the bottom hole assembly 18 with and without tool 10 with respect to torsional vibration.

Figure 14:
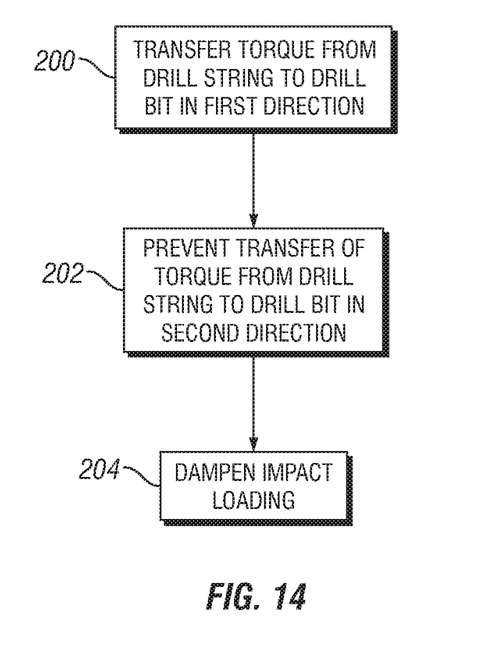
FIG. 14 is a flow chart illustrating a method of torsional vibration mitigation according to a preferred embodiment.

FIG. 14 is a flow chart that illustrates a method for mitigating torsional vibration carried out by the tools and system described above. At step 200, a wellbore is drilled by rotating a drill string to rotate a drill bit. During ordinary operation, torque is transferred from the drill string to the drill bit in a first direction. At step 202, upon the occurrence of a predetermined condition, the drill string is dis-engaged or decoupled from the drill bit (or bottom hole assembly, as the case may be). As a result, torque is not transferred from the drill string to the drill bit. That is to say, when the drill bit over-speeds, the drill string is decoupled. The predetermined condition, therefore, is that the rotational speed of the drill bit (or bottom hole assembly) is less than the rotational speed of the drill string. Once the difference between the rotational speed of the drill string and the drill bit falls below a predetermined threshold, the drill sting and the drill bit re-engage.

Although not necessary in all embodiments, preferably, at step 204, any impact loads, such as from engagement of the overrunning clutch, is dampened. Specifically, a viscous fluid may be utilized to dampen torsional vibration between the drill string and the drill bit.

In summary, a downhole tool, drilling system, and a method for mitigating torsional vibration have been described. Embodiments of the downhole tool may generally have an overrunning clutch assembly arranged for connection between a drill string and a drill bit, the overrunning clutch assembly engaging to transfer torque from the drill string to the drill bit in a first direction of rotation and disengaging to prevent transfer of torque from the drill string to the drill bit in a second direction of rotation opposite the first direction. Embodiments of the drilling system may generally have a drill string carrying a drill bit, and an overrunning clutch assembly arranged for connection between the drill string and the drill bit, the overrunning clutch assembly engaging to transfer torque from the drill string to the drill bit in a first direction of rotation and disengaging to prevent transfer of torque from the drill string to the drill bit in a second direction of rotation opposite the first direction. Embodiments of the method for mitigating torsional vibration may generally include providing an overrunning clutch assembly arranged for connection between a drill string and a drill bit, engaging the overrunning clutch assembly to transfer torque from the drill string to the drill bit in a first direction of rotation, and disengaging the overrunning clutch assembly to prevent transfer of torque from the drill string to the drill bit in a second direction of rotation opposite the first direction.

Any of the foregoing embodiments may include any one of the following elements or characteristics, alone or in combination with each other: A torsional dampener assembly coupled to the overrunning clutch assembly; the torsional dampener assembly is positioned between the overrunning clutch assembly and the drill bit; the torsional dampener assembly includes a first member, a second member driven by the first member and having limited rotational movement with respect to the first member, the first member and the second member collectively defining a fluid chamber therebetween, and a fluid received in the chamber whereby relative motion between the first and second members is dampened by the fluid; a flow restrictor disposed in the chamber; the first member is a tubular dampener housing defining an interior wall with a groove formed therein, and the second member is a dampener mandrel coaxially disposed within the dampener housing and defining an outer wall with a protrusion formed therein, the protrusion being received in the groove; the first member is a tubular dampener housing defining an interior wall with a plurality of longitudinal grooves formed therein, and the second member is a dampener mandrel coaxially disposed within the dampener housing and defining an outer wall with a plurality of longitudinal protrusions formed thereabout, each the protrusion being received in one of the plurality of grooves; an output shaft connected to and rotatively driven by the dampener mandrel, the output shaft having a lower end adapted for coupling to the drill bit; a thrust bearing coupled between the overrunning clutch assembly and the output shaft, the dampener mandrel is tubular, and a portion of the output shaft is coaxially disposed within the dampener mandrel; the overrunning clutch assembly includes a generally tubular clutch housing defining an interior wall with a tapered serration formed therein, a clutch mandrel coaxially disposed within the clutch housing and defining an outer wall with a groove formed therein, a wedge captured within the groove and urged radially outward against the interior wall of the clutch housing, wherein the wedge engages the serration to prevent unlimited relative rotation of the clutch housing with respect to the clutch mandrel in a first direction and disengages the serration to allow unlimited relative rotation of the clutch housing with respect to the clutch mandrel in a second direction opposite the first direction; the overrunning clutch assembly includes a generally tubular clutch housing defining an interior wall with a plurality of tapered serration formed therein, a clutch mandrel coaxially disposed within the clutch housing and defining an outer wall with a plurality of grooves formed therein, and a plurality of wedges, each of the plurality of grooves having one of the plurality of wedges captured therein and urged radially outward against the interior wall of the clutch housing, wherein the plurality of wedges engage the plurality of serrations to prevent unlimited relative rotation of the clutch housing with respect to the clutch mandrel in a first direction and disengage the plurality of serrations to allow unlimited relative rotation of the clutch housing with respect to the clutch mandrel in a second direction opposite the first direction; a spring disposed between the wedge and the groove so as to urge the wedge radially outward against the interior wall of the clutch housing; the spring is a linear wave spring; the overrunning clutch assembly automatically mechanically engages to transfer torque from the drill string to the drill bit in a first direction of rotation and disengages to prevent transfer of torque from the drill string to the drill bit in a second direction of rotation opposite the first direction; providing a torsional dampener assembly positioned between the overrunning clutch assembly and the drill bit; dampening by the torsional dampener assembly an impact load of the overrunning clutch assembly engaging; automatically engaging the overrunning clutch assembly to transfer torque from the drill string to the drill bit in a first direction of rotation; and automatically disengaging the overrunning clutch assembly to prevent transfer of torque from the drill string to the drill bit in a second direction of rotation opposite the first direction.

The Abstract of the disclosure is solely for providing the United States Patent and Trademark Office and the public at large with a way by which to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed is:

1. A downhole tool for mitigating torsional vibration, comprising:
   an overrunning clutch assembly arranged for connection between a drill string and a drill bit, said overrunning clutch assembly engaging to transfer torque from said drill string to said drill bit in a first direction of drill string rotation and disengaging to prevent transfer of torque from said drill string to said drill bit in a second direction of drill string rotation opposite said first direction, wherein said overrunning clutch assembly comprises:
   a generally tubular clutch housing defining an interior wall with a tapered serration formed therein;
   a clutch mandrel coaxially disposed within said clutch housing and defining an outer wall with a groove formed therein;

a wedge captured within said groove and urged radially outward against said interior wall of said clutch housing; wherein said wedge engages said serration to prevent unlimited relative rotation of said clutch housing with respect to said clutch mandrel in a first direction and disengages said serration to allow unlimited relative rotation of said clutch housing with respect to said clutch mandrel in a second direction opposite said first direction.

2. The downhole tool of claim 1 further comprising:
a torsional dampener assembly coupled to said overrunning clutch assembly.

3. The downhole tool of claim 2 wherein:
said torsional dampener assembly is positioned between said overrunning clutch assembly and said drill bit.

4. The downhole tool of claim 2 wherein said torsional dampener assembly comprises:
a first member driven by rotation of said drill string;
a second member driven by rotation of said first member and capable of limited rotational movement with respect to said first member, said first member and said second member collectively defining a fluid chamber there between;
a flow restrictor disposed in said chamber; and
a fluid received in said chamber; whereby
relative motion between said first and second members is dampened by said fluid.

5. The downhole tool of claim 4 wherein:
said first member is a tubular dampener housing defining an interior wall with a groove formed therein; and
said second member is a dampener mandrel coaxially disposed within said dampener housing and defining an outer wall with a protrusion formed therein, said protrusion being received in said groove.

6. The downhole tool of claim 5 further comprising:
an output shaft connected to and rotatively driven by said dampener mandrel, said output shaft having a lower end adapted for coupling to said drill bit; and
a thrust bearing coupled between said overrunning clutch assembly and said output shaft; wherein
said dampener mandrel is tubular, and a portion of said output shaft is coaxially disposed within said dampener mandrel.

7. The downhole tool of claim 1, wherein:
said overrunning clutch assembly automatically mechanically engages to transfer torque from said drill string to said drill bit in a first direction of rotation and disengages to prevent transfer of torque from said drill string to said drill bit in a second direction of rotation opposite said first direction.

8. A method for mitigating downhole torsional vibration, comprising:
connecting an overrunning clutch assembly between a drill string and a drill bit, wherein said overrunning clutch assembly comprises a generally tubular clutch housing defining an interior wall with a tapered serration formed therein, and a clutch mandrel coaxially disposed within said clutch housing and defining an outer wall with a groove formed therein;
rotating said drill string in a first direction;
engaging said overrunning clutch assembly to allow no relative motion between said drill sting and said drill bit so as to transfer torque from said drill string to said drill bit, wherein engaging said overrunning clutch assembly includes engaging a wedge captured within said groove with the tapered serration to prevent unlimited relative rotation of said clutch housing with respect to said clutch mandrel in a first direction; and disengaging said overrunning clutch assembly to allow relative motion between said drill string and said drill bit so long as said drill bit rotates in said first direction faster than said drill string so as to prevent transfer of torque between said drill string and said drill bit, wherein disengaging said overrunning clutch assembly includes disengaging said wedge from said serration to allow unlimited relative rotation of said clutch housing with respect to said clutch mandrel in a second direction opposite said first direction.

9. The method of claim 8 further comprising:
providing a torsional dampener assembly positioned between said overrunning clutch assembly and said drill bit; and
dampening by said torsional dampener assembly an impact load of said overrunning clutch assembly engaging.

10. The method of claim 8 further comprising:
automatically engaging said overrunning clutch assembly to transfer torque from said drill string to said drill bit when said drill string is urged to rotate faster than said drill bit; and
automatically disengaging said overrunning clutch assembly to prevent transfer of torque between said drill string and said drill bit when said drill bit is urged to rotate faster than said drill string.

11. A drilling system, comprising:
a drill string carrying a drill bit;
an overrunning clutch assembly connected between said drill string and said drill bit, said overrunning clutch assembly engaging to transfer torque from said drill string to said drill bit in a first direction of drill string rotation and disengaging to prevent transfer of torque from said drill string to said drill bit in a second drill string direction of rotation opposite said first direction, wherein said overrunning clutch assembly comprises:
a generally tubular clutch housing defining an interior wall with a tapered serration formed therein;
a clutch mandrel coaxially disposed within said clutch housing and defining an outer wall with a groove formed therein;
a wedge captured within said groove and urged radially outward against said interior wall of said clutch housing; wherein
said wedge engages said serration to prevent unlimited relative rotation of said clutch housing with respect to said clutch mandrel in a first direction and disengages said serration to allow unlimited relative rotation of said clutch housing with respect to said clutch mandrel in a second direction opposite said first direction.

12. The drilling system of claim 11 further comprising:
a torsional dampener assembly coupled to said overrunning clutch assembly.

13. The drilling system of claim 11 wherein:
said torsional dampener assembly is positioned between said overrunning clutch assembly and said drill bit.

14. The drilling system of claim 11 wherein said torsional dampener assembly comprises:
a first member driven by rotation of said drill string;
a second member driven by rotation of said first member and capable of limited rotational movement with respect to said first member, said first member and said second member collectively defining a fluid chamber therebetween;
a flow restrictor disposed in said chamber; and a fluid received in said chamber; whereby relative motion between said first and second members is dampened by said fluid.

15. The drilling system of claim 14 wherein:

said first member is a tubular dampener housing defining an interior wall with a groove formed therein; and said second member is a dampener mandrel coaxially disposed within said dampener housing and defining an outer wall with a protrusion formed therein, said protrusion being received in said groove.

16. The drilling system of claim 14 wherein:

said first member is a tubular dampener housing defining an interior wall with a plurality of longitudinal grooves formed therein; and said second member is a dampener mandrel coaxially disposed within said dampener housing and defining an outer wall with a plurality of longitudinal protrusions formed thereabout, each said protrusion being received in one of said plurality of grooves.

17. The drilling system of claim 11 wherein said overrunning clutch assembly comprises:

a generally tubular clutch housing defining an interior wall with a plurality of tapered serration formed therein;

a clutch mandrel coaxially disposed within said clutch housing and defining an outer wall with a plurality of grooves formed therein;

a plurality of wedges, each of said plurality of grooves having one of said plurality of wedges captured therein and urged radially outward against said interior wall of said clutch housing; wherein said plurality of wedges engage said plurality of serrations to prevent unlimited relative rotation of said clutch housing with respect to said clutch mandrel in a first direction and disengage said plurality of serrations to allow unlimited relative rotation of said clutch housing with respect to said clutch mandrel in a second direction opposite said first direction.

18. The drilling system of claim 17 wherein said overrunning cutch assembly further comprises:

a spring disposed between said wedge and said groove so as to urge said wedge radially outward against said interior wall of said clutch housing.

19. A downhole tool for mitigating torsional vibration, comprising:

an overrunning clutch assembly arranged for connection between a drill string and a drill bit, said overrunning clutch assembly engaging to transfer torque from said drill string to said drill bit in a first direction of drill string rotation and disengaging to prevent transfer of torque from said drill string to said drill bit in a second direction of drill string rotation opposite said first direction; and a torsional dampener assembly coupled to said overrunning clutch assembly, the torsional dampener comprising:

a first member driven by rotation of said drill string;

a second member driven by rotation of said first member and capable of limited rotational movement with respect to said first member;

a dampener element operably coupled between the first member and the second member to dampen the rotational movement of said second member with respect to the first member in response to said overrunning clutch assembly engaging.

20. A method for mitigating downhole torsional vibration, comprising:

connecting an overrunning clutch assembly between a drill string and a drill bit;

providing a torsional dampener assembly positioned between said overrunning clutch assembly and said drill bit, the torsional dampener including a first member driven by rotation of said drillstring, a second member driven by rotation of said first member and capable of limited rotation with respect to said first member, and a dampener element operably coupled between said first member and said second member;

rotating said drill string in a first direction, thereby rotatively driving said first member and said second member of said torsional dampener;

engaging said overrunning clutch assembly to allow no relative motion between said drill sting and said drill bit so as to transfer torque from said drill string to said drill bit dampening by said torsional dampener assembly a rotational impact load of said overrunning clutch assembly engaging by dampening the rotational movement of said second member with respect to the first member with the dampener element in response to said overrunning clutch assembly engaging; and disengaging said overrunning clutch assembly to allow relative motion between said drill string and said drill bit so long as said drill bit rotates in said first direction faster than said drill string so as to prevent transfer of torque between said drill string and said drill bit.

* * * * *